(12) United States Patent
Sato

(10) Patent No.: US 11,275,653 B2
(45) Date of Patent: Mar. 15, 2022

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Takumi Sato, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/012,175

(22) Filed: Sep. 4, 2020

(65) Prior Publication Data

US 2021/0271550 A1 Sep. 2, 2021

(30) Foreign Application Priority Data

Mar. 2, 2020 (JP) .............................. JP2020-034864

(51) Int. Cl.
*G06F 11/10* (2006.01)
*G11B 20/18* (2006.01)

(52) U.S. Cl.
CPC ...... *G06F 11/1076* (2013.01); *G11B 20/1879* (2013.01)

(58) Field of Classification Search
CPC .................... G06F 11/1076; G11B 20/1879
See application file for complete search history.

(56) References Cited

U.S. PATENT DOCUMENTS

| 5,270,877 | A | * | 12/1993 | Fukushima | ........ | G11B 20/1883 360/48 |
| 5,548,599 | A | * | 8/1996 | Furuhashi | ........ | G11B 20/00166 714/769 |
| 5,592,452 | A | * | 1/1997 | Yoshimoto | ............ | G06F 3/0601 369/275.1 |
| 6,310,741 | B1 | * | 10/2001 | Nishida | .................. | G11B 19/04 360/53 |
| 8,856,618 | B2 | | 10/2014 | Akiyama et al. | | |
| 8,908,308 | B1 | * | 12/2014 | Seo | ..................... | G11B 20/1816 360/45 |
| 8,922,925 | B1 | * | 12/2014 | Coker | ................ | G11B 20/1217 360/48 |

(Continued)

FOREIGN PATENT DOCUMENTS

JP H8-54988 2/1996
JP 4314651 B2 8/2009

*Primary Examiner* — Kyle Vallecillo
(74) *Attorney, Agent, or Firm* — Allen & Overy LLP

(57) ABSTRACT

According to one embodiment, a magnetic disk device includes a magnetic disk, a storage unit, a magnetic head, an error correction unit that, in a case where an error is detected in user data read by the magnetic head, performs error correction on a sector in which the error is detected in track units and acquires error correction data, and a control unit. The control unit controls reading/writing of user data, management data for managing a sector on which the error correction is performed in the track units, and the error correction data, and in a case where there is no host access, rewrites data on the track including the sector on which the error correction is performed, based on the user data stored in the track and the error correction data of the sector, in which the error is detected, of the track.

4 Claims, 6 Drawing Sheets

(56) References Cited

U.S. PATENT DOCUMENTS

| | | | | |
|---|---|---|---|---|
| 8,976,478 B1* | 3/2015 | Harllee, III | ........ | G11B 20/1879 360/53 |
| 9,075,714 B1* | 7/2015 | Tsai | ............... | G11B 20/1889 |
| 2001/0012252 A1* | 8/2001 | Yoshimoto | .......... | G11B 20/1883 369/53.22 |
| 2003/0012088 A1* | 1/2003 | Bakx | ................ | G11B 27/002 369/30.07 |
| 2005/0275962 A1* | 12/2005 | Lim | .................. | G11B 27/36 360/31 |
| 2007/0253096 A1* | 11/2007 | Alfred | .............. | G11B 19/045 360/78.04 |
| 2008/0008055 A1* | 1/2008 | Yoshimoto | ........... | G11B 7/0079 369/30.09 |
| 2011/0072232 A1* | 3/2011 | Watanabe | ............. | G11B 5/012 711/172 |
| 2017/0101189 A1* | 4/2017 | Horner | ................ | B64D 13/02 |

\* cited by examiner

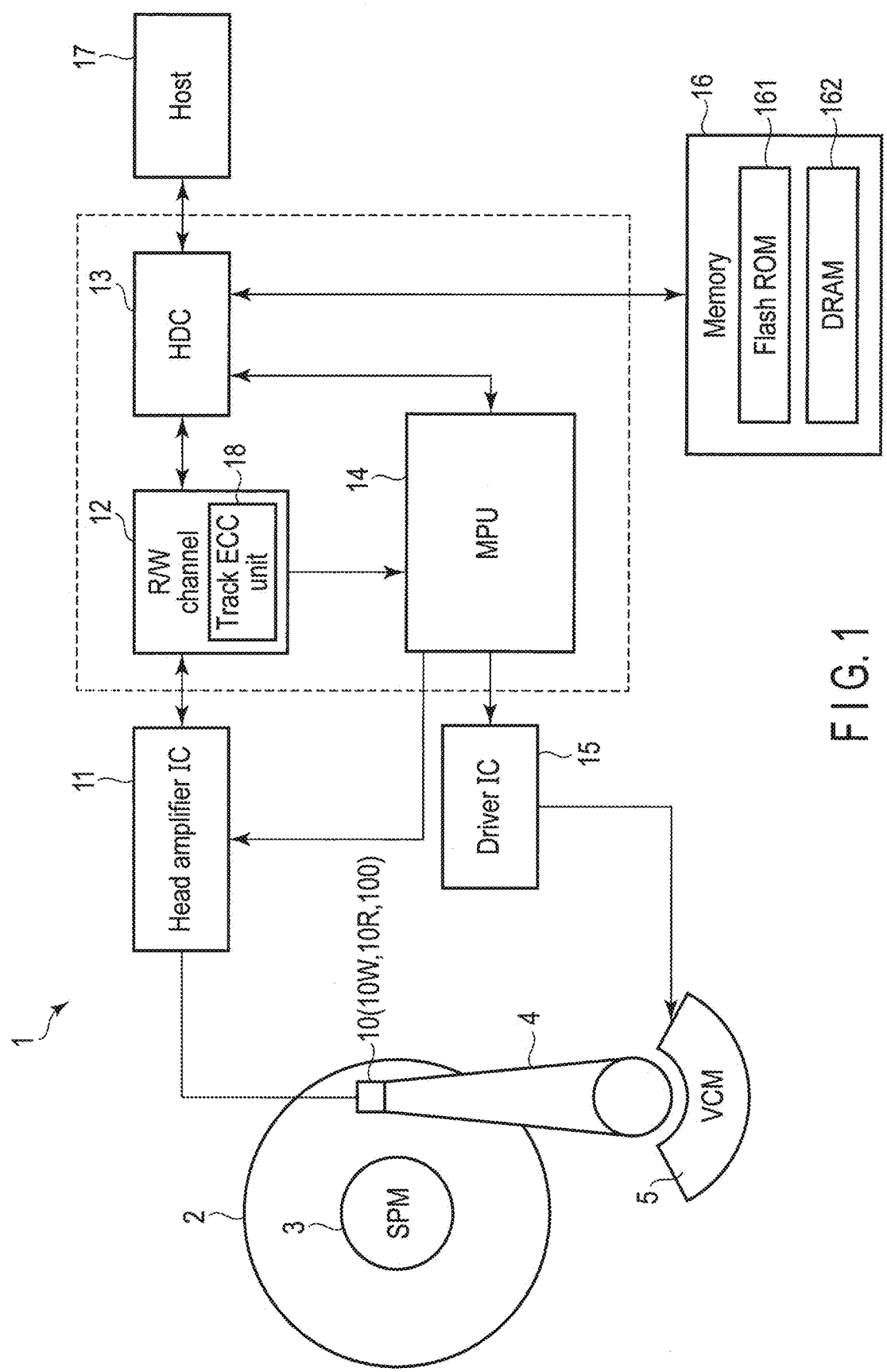
F I G. 1

MAGNETIC DISK DEVICE

CROSS-REFERENCE TO RELATED APPLICATIONS

This application is based upon and claims the benefit of priority from Japanese Patent Application No. 2020-034864, filed Mar. 2, 2020, the entire contents of which are incorporated herein by reference.

FIELD

Embodiments described herein relate generally to a magnetic disk device.

BACKGROUND

A technology has been known in which a first storage device and a second storage device are provided in a magnetic disk processing device, an address where correctable data is detected and corrected data are stored, the stored corrected data is directly sent without reading from the magnetic disk device when it is ordered to perform reading from the same address, and the corrected data is written to a magnetic disk when the processing device becomes empty. As a result, the magnetic disk device can promptly perform processing when correctable data is detected.

Embodiments of the invention provide a magnetic disk device capable of improving data quality.

BRIEF DESCRIPTION OF THE DRAWINGS

FIG. 1 is a diagram illustrating an example of a configuration of a magnetic disk device according to a first embodiment.

Figure 2:
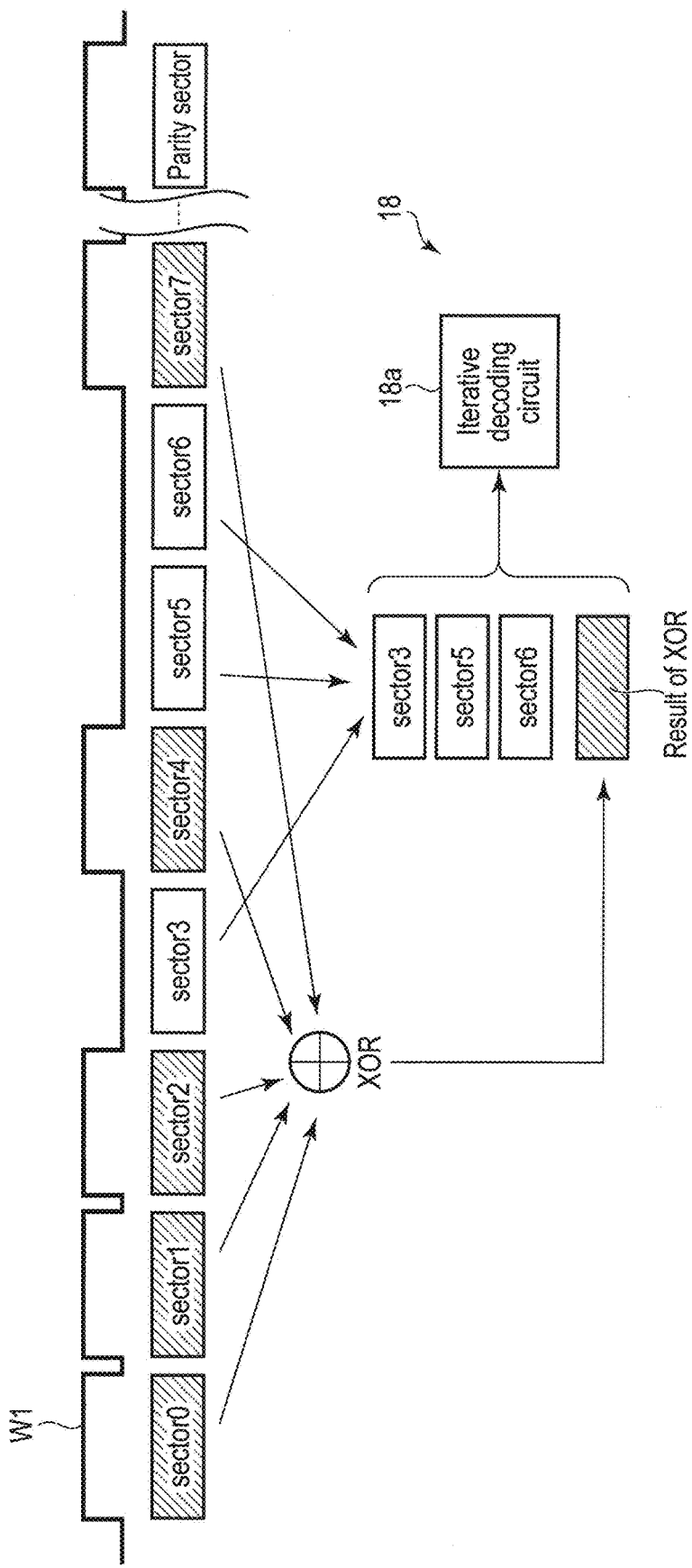
FIG. 2 is a diagram for describing an example of details of processing of a track ECC unit according to the embodiment.

DETAILED DESCRIPTION in general, according to one embodiment, a magnetic disk device includes a magnetic disk that stores user data; a storage unit that stores management data for managing a sector on which error correction is performed in track units, and error correction data of the sector on which the error correction is performed; a magnetic head that reads/writes data on the magnetic disk; an error correction unit that, in a case where an error is detected in the user data read by the magnetic head, performs the error correction on the sector in which the error is detected in the track units and acquires the error correction data; and a control unit that controls reading/writing of the data on the magnetic disk. The control unit controls reading/writing of the user data, the error correction data, and the management data, and in a case where there is no host access, rewrites data on the track including the sector on which the error correction is performed, based on the user data stored in the track and the error correction data of the sector, in which the error is detected, of the track.

First Embodiment

FIG. 1 is a diagram illustrating an example of a configuration of a magnetic disk device 1 according to a first embodiment.

As illustrated in FIG. 1, the magnetic disk device 1 is configured as, for example, a hard disk drive (HDD), and includes a magnetic disk 2, a spindle motor (SPM) 3, an actuator 4, a voice coil motor (VCM) 5, a magnetic head 10, a head amplifier IC 11, an R/W channel 12, a hard disk controller (HDC) 13, a microprocessor (MPU) 14, a driver IC 15, and a memory 16. Further, the magnetic disk device 1 can be connected to a host computer (host) 17. The magnetic head 10, which will be described below in detail, includes a write head (recording head: writer) 10W, a read head (reading head: reader) 10R, and a spin-torque oscillator (STO) 100 that is a high-frequency oscillator. The R/W channel 12, the HDC 13, and the MPU 14 may be incorporated in a one-chip integrated circuit.

The magnetic disk 2 has, for example, a disk-shaped substrate made of a non-magnetic material. A soft magnetic layer which is made of a material exhibiting soft magnetic characteristics as an underlayer, a magnetic recording layer having magnetic anisotropy in a direction perpendicular to the disk surface on an upper layer portion of the soft magnetic layer, and a protective film layer on an upper layer portion of the magnetic recording layer are laminated on each surface of the substrate in this order. Here, the direction of the magnetic head 10 is the upper layer.

The magnetic disk 2 is fixed to the spindle motor (SPM) 3 and is rotated at a predetermined speed by the SPM 3. Note that the number of magnetic disks 2 is not limited to one, and a plurality of magnetic disks 2 may be installed in the SPM 3. The SPM 3 is driven by the drive current (or drive voltage) supplied from the driver IC 15. The data pattern of the magnetic disk 2 is recorded and read by the magnetic head 10.

The actuator 4 is rotatably installed, and the magnetic head 10 is supported at the tip end of the actuator 4. With the rotation of the actuator 4 by the voice coil motor (VCM) 5, the magnetic head 10 is moved and positioned on a desired track of the magnetic disk 2. The VCM 5 is driven by the drive current (or drive voltage) supplied from the driver IC 15.

The magnetic head 10 has a slider provided at the tip end of the actuator 4, the write head 10W formed on the slider, and the read head 10R (refer to FIG. 2). A plurality of magnetic heads 10 is provided according to the number of magnetic disks 2.

The head amplifier IC 11 includes a circuit relating to driving and detection of oscillation characteristics of the STO 100. The head amplifier IC 11 executes driving of the STO 100 and detection of a driving signal. Further, the head amplifier IC 11 supplies a write signal (write current) corresponding to write data supplied from the R/W channel 12 to the write head 10W. Further, the head amplifier IC 11 amplifies a read signal output from the read head 10R and transmits the read signal to the R/W channel 12.

The R/W channel 12 is a signal processing circuit that processes signals relating to reading (read)/writing (write). The R/W channel 12 includes a read channel that executes signal processing of read data and a write channel that executes signal processing of write data. The R/W channel 12 converts the read signal into digital data and demodulates the read data from the digital data. The R/W channel 12 encodes the write data transferred from the HDC 13 and transfers the encoded write data to the head amplifier IC 11. Further, the R/W channel 12 is provided with a track error correction (ECC) unit 18. The track ECC unit 18 will be described below with reference to FIG. 2.

The HDC 13 controls writing of data to the magnetic disk 2 and reading of data from the magnetic disk 2 via the magnetic head 10, the head amplifier IC 11, the R/W channel 12, and the MPU 14. The HDC 13 constitutes an interface between the magnetic disk device 1 and the host 17 and executes transfer control of read data and write data. That is, the HDC 13 functions as a host interface controller that receives a signal transferred from the host 17 and transfers a signal to the host 17. Further, the HDC 13 receives a command (write command, read command, or the like) transferred from the host 17, and transmits the received command to the MPU 14.

The MPU 14 is a main controller (control unit) of the magnetic disk device 1, and executes control of reading/writing operations and servo control necessary for positioning the magnetic head 10.

The driver IC 15 controls driving of the SPM 3 and the VCM 5 under the control of the MPU 14. The magnetic head 10 is positioned on a target track on the magnetic disk 2 by the driving of the VCM 5.

The memory 16 includes a flash ROM 161 which is a non-volatile memory and a DRAM 162 which is a volatile memory. For example, the flash ROM 161 stores programs and parameters necessary for the processing of the MPU 14. The DRAM 162 is used as a work area or the like.

Next, the track ECC unit 18 will be described. FIG. 2 is a diagram for describing an example of details of processing of the track ECC unit 18. FIG. 2 illustrates an example of a case of reading a parity sector and sectors of a predetermined track. This processing is executed in track units. A plurality of (for example, 1000 or more) sectors is provided in a track, and store user data. The parity sector is provided in the last sector of a track, and stores parity data for error correction of data read from the sector.

In FIG. 2, when a signal detection waveform W1 is rising is when data of the sector is detected. Therefore, FIG. 2 illustrates that the data of a sector 0, a sector 1, a sector 4, a sector 7, . . . , and the parity sector is detected. The data of the sector 0, the sector 1, the sector 4, and the sector 7 in which the data is detected in this way is operated by an XOR (exclusive logic) circuit, and the result of the XOR is obtained. The obtained result of the XOR and data of a sector 3, a sector 5, and a sector 6 in which the read error is detected are input to an iterative decoding circuit 18a.

The iterative decoding circuit 18a uses the result of the XOR and the data of the sector in which the error is detected to perform error correction on the sector in which the error is detected. For example, the error correction of the data is performed by executing processing such as shifting the order of the digital data read from the sector or replacing 0s and 1s of some data at high speed.

Normally, in a case where the processing result of the XOR and the data of the parity sector are used, error correction on only one sector can be performed. However, in the present embodiment, since the track ECC unit 18 (iterative decoding circuit 18a) is provided, it is possible to perform error correction even if read errors of two or more sectors are detected in one track. In the present embodiment, the track ECC unit 18 can perform correction even if an error occurs in 31 sectors. The upper limit number of sectors on which the error correction can be performed by the track ECC unit 18 can be changed based on the processing capability of the R/W channel 12, the time allowed for error correction, and the like.

Next, the structure of a recording area of the magnetic disk 2 will be described. In the present embodiment, a case where data is recorded on the magnetic disk 2 by a so-called shingled magnetic recording (SMR) method will be described.

Figures 3, 4:
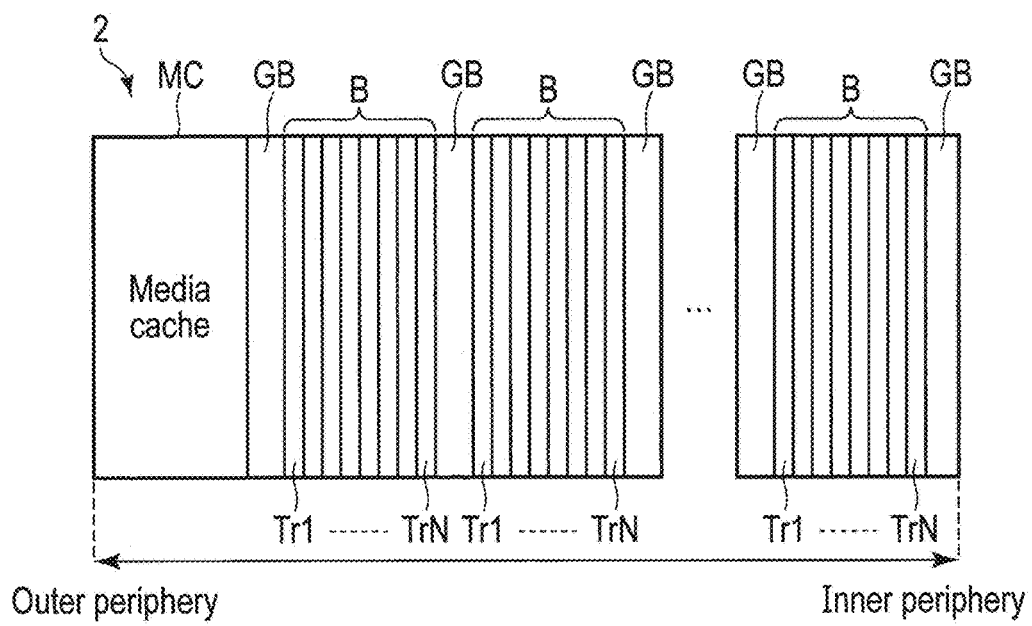
FIG. 3 is a diagram illustrating an example of a storage area of a magnetic disk according to the embodiment.
FIG. 4 is a diagram illustrating an example of details of an error correction number management section according to the embodiment.
Figure 5:
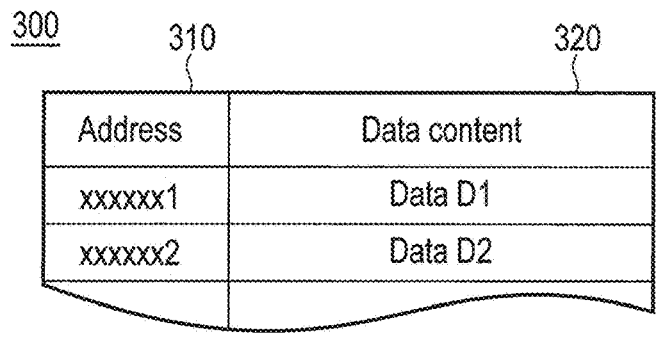
FIG. 5 is a diagram illustrating an example of a data management section according to the embodiment.

FIG. 3 is a diagram illustrating an example of a storage area of the magnetic disk 2. The magnetic disk 2 is provided with a plurality of bands B including a plurality of tracks Tr1, . . . , and TrN. The band B is defined as the minimum configuration group of tracks that continuously record data. Therefore, the tracks Tr1, . . . , and TrN in the band B are continuously shingled. A guard band GB is provided between one band B and the next band B. A media cache MC, which is a storage unit, is provided with an area for managing data and an area for temporarily recording data. Here, the area for managing data includes an error correction number management section that manages information (management data) relating to a sector on which the error correction is performed. FIG. 4 is a diagram illustrating an example of details of the error correction number management section, and the details will be described below. The area for temporarily storing data includes a data management section that stores data (error correction data) in which an error of a sector in which an error is detected is corrected. FIG. 5 is a diagram illustrating an example of details of the data management section, and the details will be described below. Note that, in the present embodiment, a case in which the media cache MC is provided on the outer peripheral side of the magnetic disk 2 will be described as illustrated in FIG. 3, but the present invention is not limited to this, and the media cache MC may be provided on the inner peripheral side or a predetermined position in the recording area of the magnetic disk 2.

Here, shingled recording of the magnetic disk device 1 will be described. When a data recording request is received from the host 17, recording data received by a buffer memory (not illustrated) is temporarily recorded in a predetermined area of the media cache MC. The data stored in the media cache MC is recalculated so that it can be sequentially accessed as an address on the magnetic disk 2, and is shingled recorded in a predetermined band B. In case of rewriting the recorded data, the already recorded old data of the band B is read, and is merged with rewriting target data in the media cache MC, and shingled recording is performed in a new band.

FIG. 4 is a diagram illustrating an example of an error correction number management section 200. The error correction number management section 200 manages the error correction number of the sector for each track in all of the bands B and the address of the corrected data.

As illustrated in FIG. 4, the error correction number management section 200 manages fields of a band number 210, a track number 220, an error correction number 230, and an address 240 in association with each other. The band number 210 is a number for identifying the band B. The track number 220 is a number for identifying the track, and corresponds to the tracks Tr1, . . . , and TrN in the example of FIG. 3. The error correction number 230 is the number of sectors in the track in which an error is detected in the data read from the sector and error correction of the data is performed by the track ECC unit 18. The address 240 is an address of an area in which the data of the sector on which the error correction is performed is recorded. Therefore, in a case where error correction is performed for a plurality of sectors, a plurality of addresses is stored. As the address, for example, a start address and an end address of the recording area are stored.

In FIG. 4, for example, it is illustrated that the error correction number 230 is 15 in a track of which the band number 210 is the band 1 and the track number 220 is the track 1. That is, it is illustrated that, in the track 1 of the band 1, the number of sectors on which error correction is performed is 15. Addresses for the storage of the error correction data of the 15 sectors are stored in the address 240.

FIG. 5 is a diagram illustrating an example of a data management section 300. The data management section 300 manages the data of the sector on which the error correction is performed. As illustrated in FIG. 5, an address 310 and a data content 320 are associated with each other. The address 310 corresponds to the address 240 managed by the error correction number management section 200, and the data content 320 is the content of the data recorded at the address. In FIG. 5, for example, data D1 is stored in association with an address XXXXX1.

Figure 6:
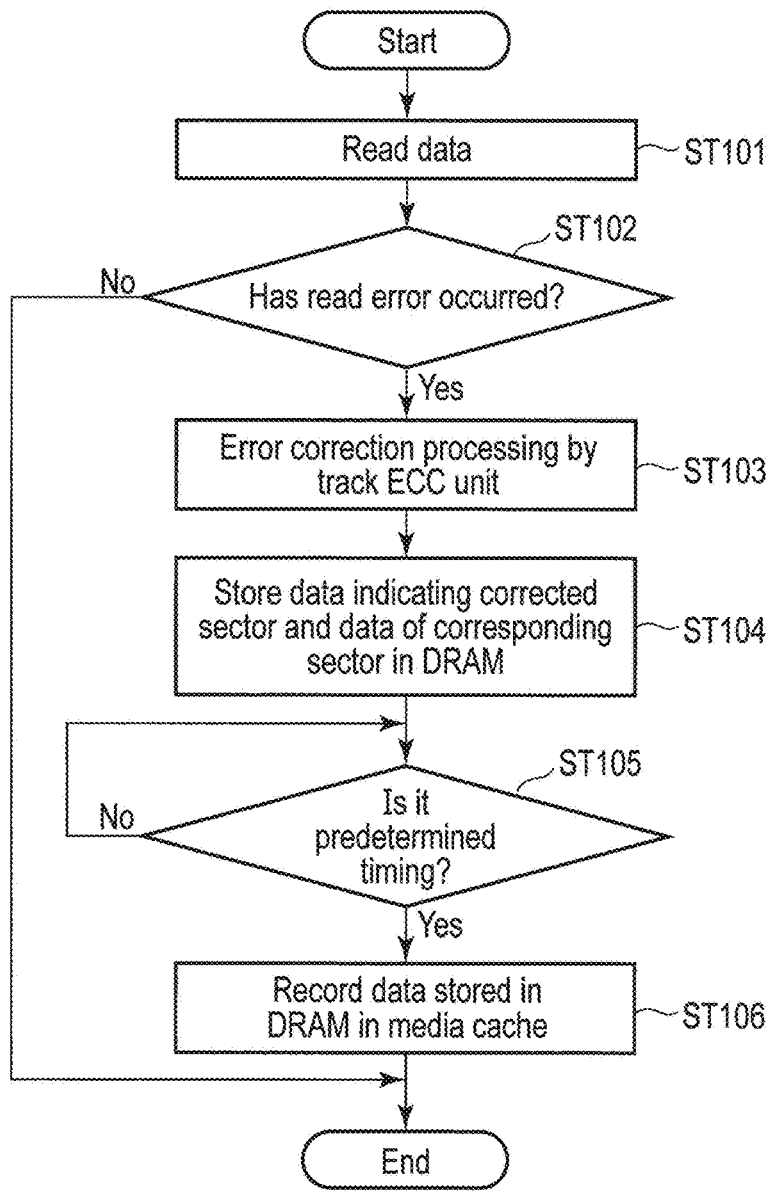
FIG. 6 is a flowchart illustrating an example of processing according to the embodiment, which is executed by the magnetic disk device when a read command is received from a host.

Next, processing of reading data from the magnetic disk 2 will be described. FIG. 6 is a flowchart illustrating an example of processing which is executed by the magnetic disk device 1 when a read command is received from the host 17.

As illustrated in FIG. 6, when the read command is received, the magnetic disk device 1 reads the data (ST101). More specifically, the magnetic head 10 is positioned at the address designated by the read command, analog data read by the magnetic head 10 is converted into digital data by the R/W channel 12, and data based on the designated address can be obtained. In the present embodiment, since the data is shingled and the continuous data is stored in the tracks, the data is read for each track.

Next, the R/W channel 12 determines whether or not a read error has occurred (ST102). In a case where the R/W channel 12 determines that a read error has not occurred (ST102: NO), the processing ends. On the other hand, in a case where the R/W channel 12 determines that a read error has occurred (ST102: YES), the track ECC unit 18 executes the above-described error correction processing (ST103). When the error correction processing is executed in this way, the MPU 14 receives the processing result, and stores the data indicating the corrected sector and the error correction data of the sector in the DRAM 162 (ST104). Here, more specifically, the data indicating the corrected sector includes a band number, a track number, and a sector number.

Next, the MPU 14 determines whether it is a predetermined timing (ST105). The predetermined timing is, for example, a timing when there is no host access. Further, for example, it is a timing to interrupt the preset host access. Thus, the timing is set in advance, and the MPU 14 determines whether it is the timing. In a case where the MPU 14 determines that it is not the predetermined timing (ST105: NO), the processing returns to step ST105. That is, it becomes a standby state.

In a case where it is determined that it is the predetermined timing (ST105: YES), the MPU 14 records the data stored in the DRAM 162 in the media cache MC (ST106). As a result, the error correction number management section 200 and the data management section 300 are each updated. Specifically, in the error correction number management section 200, the error correction number of the corresponding sector is incremented and the address storing the data of the sector is added. Further, in the data management section 300, the error correction data of the sector is stored at the added address. Further, in this case, these pieces of data are cleared from the DRAM 162. As described above, in the magnetic disk device 1, the data indicating the corrected sector and the error correction data are stored in the media cache MC via the DRAM 162 at every predetermined timing.

Figure 7:
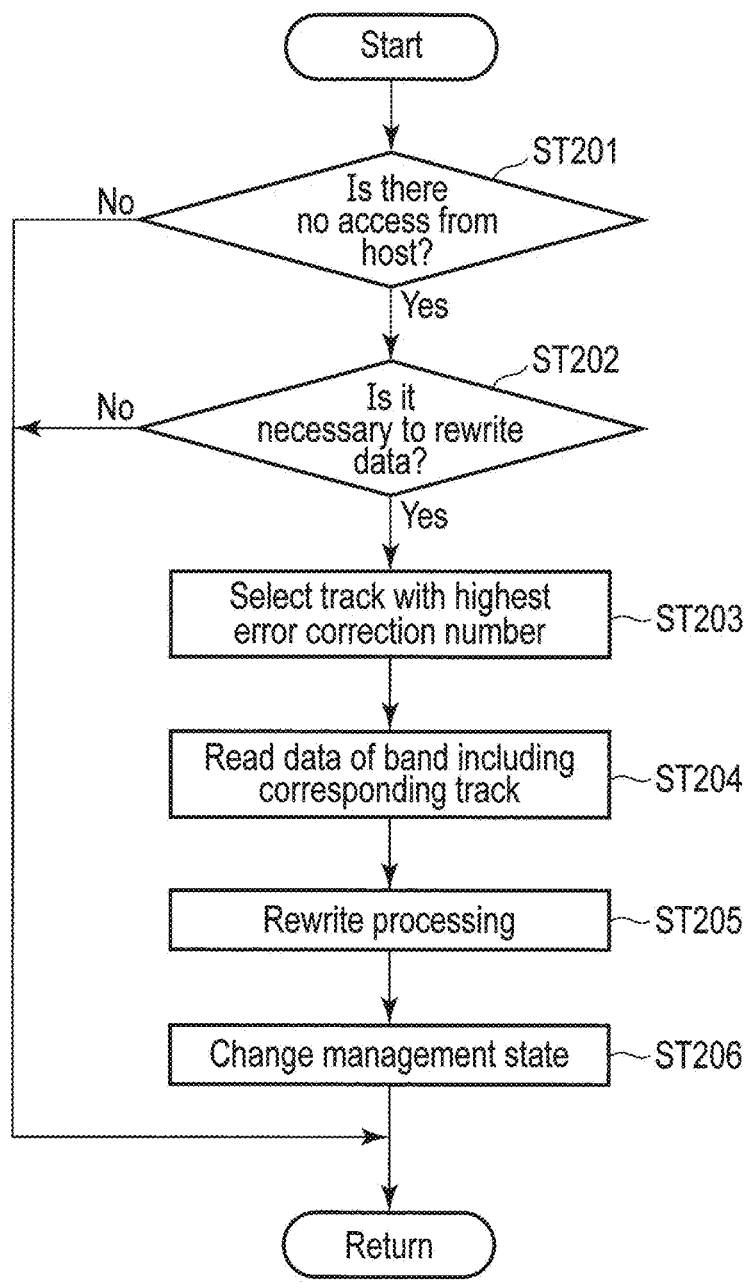
FIG. 7 is a flowchart illustrating an example of rewrite processing according to the embodiment.

Next, processing of rewriting the data stored in the media cache MC to the band B will be described. FIG. 7 is a flowchart illustrating an example of rewrite processing executed by the MPU 14.

As illustrated in FIG. 7, first, the MPU 14 determines whether or not there is an access from the host 17 (ST201). In a case where it is determined that there is an access from the host 17 (ST201: NO), the processing returns. On the other hand, in a case where it is determined that there is no access from the host 17 (ST201: YES), the processing from step ST202 to step ST206 is executed. That is, the processing from step ST202 to step ST206 is executed at a timing when there is no host access such as an idle state.

Next, the MPU 14 determines whether or not it is necessary to rewrite the data (ST202). More specifically, the MPU 14 refers to the error correction number management section 200 and makes the determination based on whether or not there is a track of which the error correction number is counted. The MPU 14 determines that it is necessary to rewrite the data in a case where there is a track of which the error correction number is counted, and determines that it is not necessary to rewrite the data in a case where there is no track of which the error correction number is counted. In a case where the MPU 14 determines that it is not necessary to rewrite the data (ST202: NO), the processing returns.

In a case where it is determined that it is necessary to rewrite the data (ST202: YES), the MPU 14 selects a track with the highest error correction number from the tracks of which the error correction number is counted (ST203). That is, the MPU 14 searches the error correction numbers of the error correction number management section 200 for the highest error correction number, and selects a track corresponding to the error correction number. In case of FIG. 4, the highest error correction number is 15, and the corresponding track 1 of band 1 is selected.

Next, the MPU 14 reads the data of the band B including the track selected in step ST203 (ST204), and performs rewrite processing of the read data to the band B including the selected track (ST205). In case of FIG. 4, since the track 1 of the band 1 is selected, the data of the band 1 including the track 1 is read. In this case, regarding the sector in which an error is detected and which is included in the band 1, the data is read from the address (media cache MC) where the data of the sector is stored and merged with the data read from the band B. Then, the MPU 14 writes the read data in the band 1. In this way, the rewrite processing is executed.

Next, the MPU 14 changes a management state (ST206). In the present embodiment, the states of the error correction number management section 200 and the data management section 300 are changed. That is, the error correction number of the band B that has undergone the rewrite processing and the address of the data of the sector are cleared in the error correction number management section 200, and the content of the data corresponding to the cleared address is deleted in the data management section 300. In case of FIG. 4, the error correction number and the address of the band 1 of the error correction number management section 200 are cleared, and the content of the data corresponding to the address is cleared.

With the magnetic disk device 1 described above, in a case where there is no host access, based on the management data stored in the error correction number management section 200, for the band B including a track including a sector on which error correction is performed, the MPU 14 creates the data of the band B including the track based on the user data stored in the band B including the track and the error correction data of the sector, in which an error is detected, of the track of the band B, and rewrites the created data to the band B. In this way, when there is no host access, since the data of the band B including the sector in which the error is detected is rewritten, the magnetic disk device 1 can rewrite the data before the error correction capability of the track ECC unit 18 is exceeded, and improve the data quality.

Further, the magnetic disk device preferentially executes the rewrite processing from the band B including the track with the high error correction number. Therefore, the magnetic disk device 1 can further prevent the error correction number of the sector managed by the error correction number management section 200 from exceeding the error correction capability of the track ECC unit 18.

Second Embodiment

A second embodiment is different from the first embodiment in that an alarm is transmitted from a magnetic disk device 1 to a host 17 in a fixed case. Therefore, in the second embodiment, the processing will be described in detail. The same components as those in the first embodiment are denoted by the same reference numerals, and detailed description thereof will be omitted.

Figure 8:
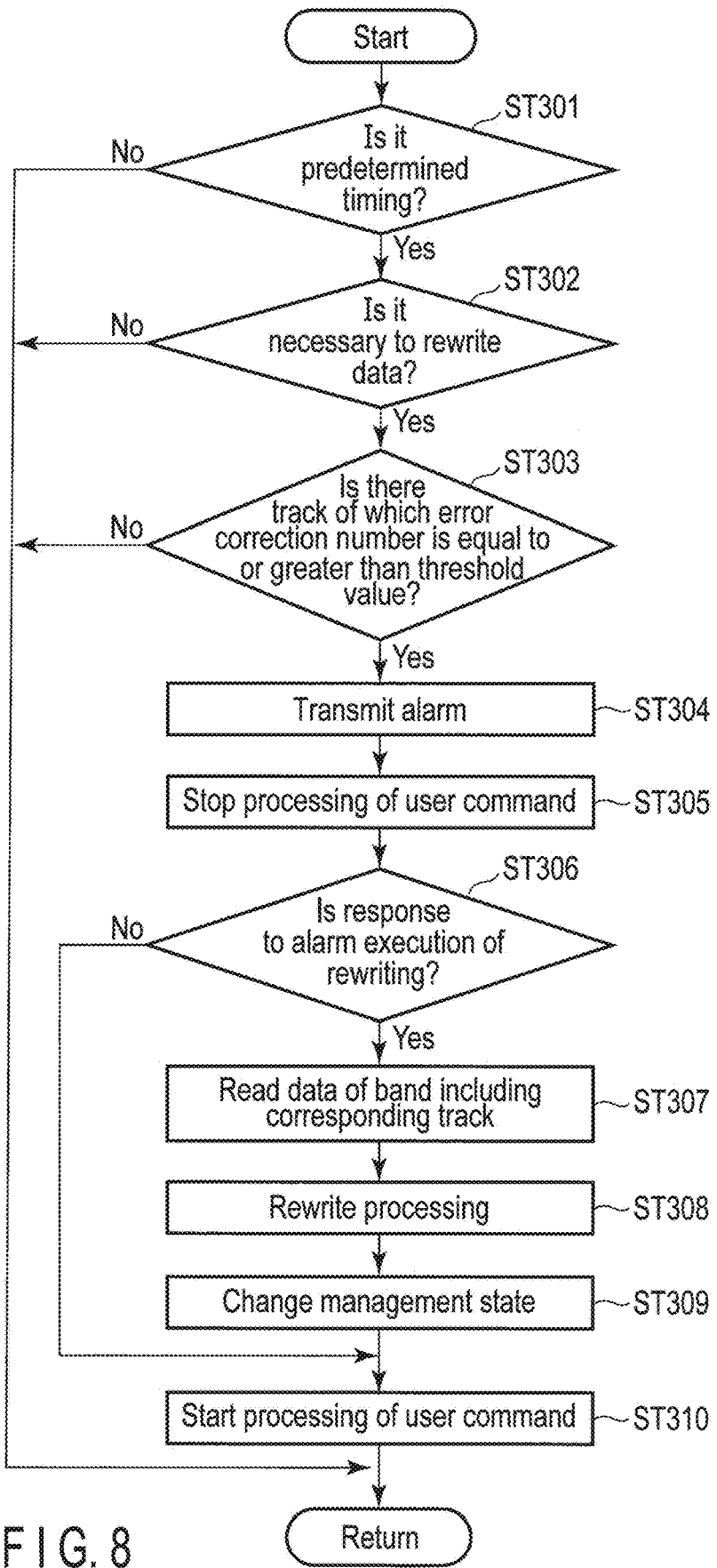
FIG. 8 is a flowchart illustrating an example of rewrite processing according to a second embodiment.

FIG. 8 is a flowchart illustrating an example of rewrite processing according to the present embodiment.

As illustrated in FIG. 8, an MPU 14 determines whether it is a predetermined timing (ST301). The predetermined timing is, for example, a timing when a predetermined time has passed after this processing was performed last time. The predetermined timing is not limited to this, and another timing may be set. In a case where the MPU 14 determines that it is not the predetermined timing (ST301: NO), the processing returns.

Further, in a case where it is determined that it is the predetermined timing (ST301: YES), the MPU 14 determines whether or not it is necessary to rewrite the data. Since the processing of step ST301 is the same as the processing of step ST202, the description will be omitted.

In a case where it is determined that it is necessary to rewrite the data (ST302: YES), the MPU 14 determines whether or not there is a track of which the error correction number is equal to or greater than a threshold value (ST303). That is, the MPU 14 determines whether or not there is a track of which the error correction number exceeds the threshold value by referring to an error correction number management section 200. Here, the threshold value is set in advance, and is set so as not to exceed the upper limit number of the error correction capability of a track ECC unit 18. In the present embodiment, since the track ECC unit 18 can perform the error correction on up to 31 sectors, the threshold value is set to a value less than 31. For example, the threshold value is set as 25 with some allowance up to the upper limit number. In a case where the MPU 14 determines that there is no track of which the error correction number is equal to or greater than the threshold value (ST303: NO), the processing returns.

On the other hand, in a case where it is determined that there is a track of which the error correction number is equal to or greater than the threshold value (ST303: YES), the MPU 14 transmits an alarm (ST304). More specifically, the MPU 14 transmits to the host 17 an alarm indicating that a track of which the number of sectors in which an error is detected is equal to or greater than the threshold value has occurred. In case of receiving the alarm, the host 17 displays the alarm on a display unit or the like, and also displays a message prompting an administrator of the host 17 to give an instruction. For example, on the display unit of the host, "YES" and "NO" buttons are displayed together with a message such as "execute rewrite processing?". Then, an input result of the button is transmitted to the magnetic disk device 1.

After the alarm is transmitted in step ST304, the MPU 14 stops processing of a user command (ST305). As a result, it is possible to prevent the data of the track of which the error correction number is equal to or greater than the threshold value from being read again. Therefore, the magnetic disk device 1 can prevent the error correction number of the track from exceeding the error correction capability of the track ECC unit 18.

Next, the MPU 14 determines whether a response result to the above-described alarm is execution of rewriting (ST306). In case of the above-described example, the MPU 14 determines that the response result is the execution of rewriting in a case where an instruction of "YES" is received from the host, and determines that the response result is non-execution of rewriting in a case where an instruction of "NO" is received.

In a case where it is determined that the response result is the execution of rewriting (ST306: YES), the MPU 14 reads the data of the band B including the track of which the error correction number is the threshold value (ST307), executes the rewrite processing (ST308), and changes the management state (ST309). Since the processing of steps ST307, ST308, and ST309 is the same as the processing of steps ST204, ST205, and ST206 already described, the description will be omitted. Then, the MPU 14 starts the processing of the user command (ST310) and ends this processing.

With the magnetic disk device 1 described above, when the error correction number is equal to or greater than the threshold value, the MPU 14 transmits an alarm to the host 17, and executes rewriting based on the response result of the alarm. Therefore, it is possible to execute the rewriting with the intention of the user. For example, in a case where the importance of the processing on which an instruction is currently given to the magnetic disk device 1 by the user is high, it is possible to instruct the magnetic disk device 1 to preferentially execute the processing. In this case, the processing may be executed on the track of which the error correction number is the threshold value, but the threshold value is set to be lower than the error correction capability of the track ECC unit 18, and therefore even if the processing is executed, the data can be read and the reliability of the data in the magnetic disk device 1 is not impaired.

Further, in the above embodiment, the case where the data recording on a magnetic disk 2 of the magnetic disk device 1 is executed by the SMR method has been described, but the data recording method is not limited to this. For example, the above-described technique can be used even for the writing by a conventional magnetic recording (CMR) method. Also in the magnetic disk device using the CMR method, for example, for large data (at least one track or more), the above-described technique can be effectively used in case of rewriting the data in track units. In this case, the error correction number management section 200 and a data management section 300 may not be provided in the magnetic disk 2, and may be provided in a flash ROM 161, for example. For a magnetic disk device using a data recording method that distinguishes between an area where recording is performed by the SMR method and an area where recording is performed by the CMR method regarding the recording area of one magnetic disk 2, it is possible to apply the technology described above to both the areas.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk that stores user data;
a storage unit that stores management data for managing a sector on which error correction is performed in track units, and error correction data of the sector on which the error correction is performed;
a magnetic head that reads/writes data on the magnetic disk;
an error correction unit that, in a case where an error is detected in the user data read by the magnetic head, performs the error correction on the sector in which the error is detected in the track units and acquires the error correction data; and
a control unit that controls reading/writing of the data on the magnetic disk,
wherein the control unit controls reading/writing of the user data, the management data, and the error correction data, and in a case where there is no host access, rewrites data on a track including the sector on which the error correction is performed, based on the user data stored in the track and the error correction data of the sector, in which the error is detected, of the track,
wherein the storage unit is provided in the magnetic disk,
an area of the storage unit where the user data is stored is constituted by band units including a plurality of tracks, and
in a case where the rewriting is performed, the control unit is configured to execute the rewriting on a band including the track, and
wherein the management data includes a sector number of the sectors in which the error is detected and an address of the error correction data of the sector in which the error is detected, for each of the tracks in all of the bands.

2. The magnetic disk device according to claim 1,
wherein in a case where a plurality of tracks including the sector in which the error is detected is detected from the management data, the control unit is configured to select a track with the highest number of sectors in which the error is detected, and execute the rewriting on the band including the selected track.

3. A magnetic disk device comprising:
a magnetic disk that stores user data;
a storage unit that stores management data for managing a sector on which error correction is performed in track units, and error correction data of the sector on which the error correction is performed;
a magnetic head that reads/writes data on the magnetic disk;
an error correction unit that, in a case where an error is detected in the user data read by the magnetic head, performs the error correction on the sector in which the error is detected in the track units and acquires the error correction data; and
a control unit that controls reading/writing of the data on the magnetic disk,
wherein the control unit controls reading/writing of the user data, the management data, and the error correction data, and in a case where there is no host access, rewrites data on a track including the sector on which the error correction is performed, based on the user data stored in the track and the error correction data of the sector, in which the error is detected, of the track, and
wherein when the number of sectors in which the error is detected becomes equal to or greater than a predetermined sector number, the control unit is configured to transmit an alarm to a host, and executes the rewriting based on a response result to the alarm.

4. The magnetic disk device according to claim 3,
wherein the control unit is configured to stop processing of a command being processed before transmitting the alarm, and start the processing of the command according to the response result to the alarm.

* * * * *